United States Patent [19]

Engel

[11] Patent Number: 5,727,521
[45] Date of Patent: Mar. 17, 1998

[54] CYLINDER HEAD OF AN INTERNAL-COMBUSTION ENGINE

[75] Inventor: Ulrich Engel, Plochingen, Germany

[73] Assignee: Mercedes-Benz AG, Stuttgart, Germany

[21] Appl. No.: 805,360

[22] Filed: Feb. 24, 1997

[30] Foreign Application Priority Data

Mar. 22, 1996 [DE] Germany .................. 196 11 362.8

[51] Int. Cl.$^6$ .................................................. F02B 31/08
[52] U.S. Cl. ............................................................ 123/308
[58] Field of Search ................................. 123/308, 301, 123/302

[56] References Cited

U.S. PATENT DOCUMENTS 4,285,310  8/1981  Takizawa et al. ............... 123/308
5,119,784  6/1992  Hashimoto et al. ............. 123/432
5,269,270  12/1993  Suzuki et al. .................. 123/308
5,301,636  4/1994  Nakamura ...................... 123/308

FOREIGN PATENT DOCUMENTS 2 322 202  11/1973  Germany .
894 312     4/1962  United Kingdom .
895 554     5/1962  United Kingdom .

*Primary Examiner*—Andrew M. Dolinar
*Attorney, Agent, or Firm*—Klaus J. Bach

[57] ABSTRACT

In a cylinder head of an internal combustion engine with first and second inlet valve ports per cylinder which are controlled by first and second inlet valves, respectively, with different valve lift dependent swirl levels, the first inlet port which is designed to generate a high swirl level with a relatively small valve lift has a smaller valve lift than the second inlet port which is designed to provide a relatively high swirl level with a high valve lift.

2 Claims, 2 Drawing Sheets

CYLINDER HEAD OF AN INTERNAL-COMBUSTION ENGINE

BACKGROUND OF THE INVENTION

The invention relates to a cylinder head of an internal-combustion engine, especially of a diesel engine, with at least two inlet ports per cylinder which have different swirl coefficients and which are controlled by inlet valves.

Especially in diesel engines with direct fuel injection it is known to design the air inlet port into a cylinder as a swirl port, in order to achieve good swirling of the combustion air together with the fuel in the combustion space. However, filling degree of the combustion chamber is reduced thereby. In order to avoid this disadvantage, a second inlet port is often provided, which is usually designed as a filling port opening tangentially into the combustion chamber to ensure good filling. The swirl generated in the combustion chamber changes with the valve lift, specifically the swirl generated by the swirl port decreases with an increase in valve lift, while the swirl generated by the filling port, although increasing with an increasing valve lift, cannot compensate for the swirl reduction of the swirl port. The swirl is therefore reduced considerably towards the end of the inlet valve opening stroke.

The object of the invention is to provide a cylinder head with at least two inlet ports per cylinder with which a high swirl is achieved over the entire inlet operation.

SUMMARY OF THE INVENTION

In a cylinder head of an internal combustion engine with first and second inlet valve ports per cylinder which are controlled by first and second inlet valves, respectively, and which have different valve lift dependent swirl levels, the first inlet port which is designed to generate a high swirl level at a relatively small valve lift has a smaller valve lift than the second inlet port which is designed to provide a relatively high swirl level with a high valve lift.

Since, with the arrangement according to the present invention, the first inlet valve assigned to the inlet port with the high swirl coefficient has a smaller valve lift than the second inlet valve assigned to the inlet port with the low swirl coefficient, a high swirling action is obtained with the full valve lift of the two inlet valves because the high swirl action achieved with the smaller valve lift of the first inlet valve is reinforced by the relatively high swirl action achieved with the larger valve lift of the second inlet valve, so that, altogether, a swirl increase occurs.

If the inlet valves are actuated by cams of a camshaft, the cam actuating the first inlet valve is designed with a smaller cam lift than the cam actuating the second inlet valve. For an internal-combustion engine having a restricted speed range, but an increased swirl requirement which is desirable, for example, for commercial vehicles, the cam for the first inlet valve is designed, for example, for a maximum valve stroke of 6 mm and the cam for the second inlet valve is designed for a maximum valve stroke of 8 mm.

If the inlet valves are actuated by electrical or hydraulic devices, as is known per se, the different valve lifts are achieved by controlling these devices correspondingly.

In a particular embodiment of the invention, the second inlet valve assigned to the inlet port with the lower swirl coefficient can be actuated, by means known per se, for example by changing over to a cam with a small cam lift such as 3 mm, or by changing the effective length of the force path between the cam and valve, for example, with a hydraulic operating means with an extremely small valve lift in such a way that the valve remains almost closed. With such an arrangement advantages as far as swirl and airflow through the valves are concerned can be obtained.

The invention is explained in greater detail below with reference to the accompanying drawings.

DESCRIPTION OF A PREFERRED EMBODIMENT

Figure 1:
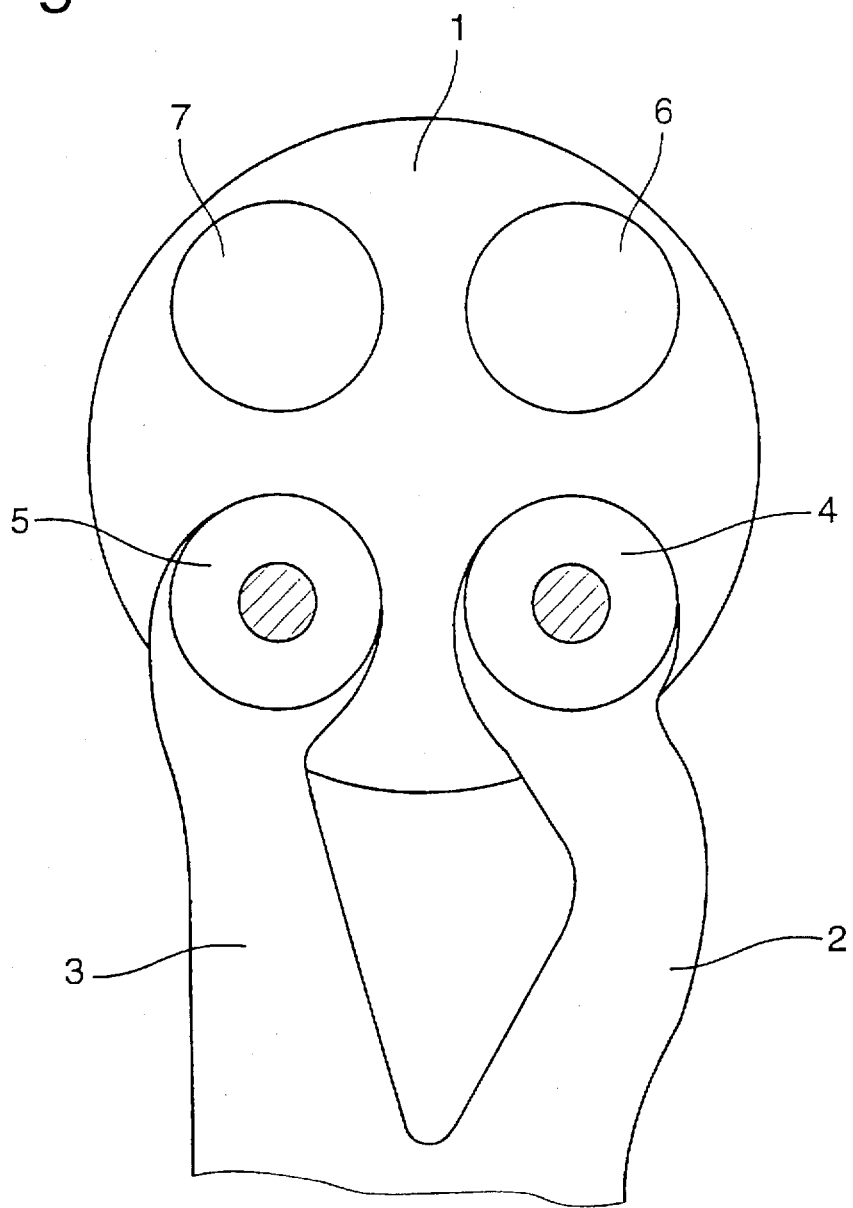
FIG. 1 is a diagrammatic representation of a combustion space of a cylinder of an internal-combustion engine, with two inlet ports opening into the combustion space.

FIG. 1 shows the combustion chamber 1 of a cylinder of a diesel internal-combustion engine with direct fuel injection, having two inlet ports 2 and 3 controlled by inlet valves 4 and 5 opening into the combustion chamber. The first inlet port 2 is designed as a swirl port and generates a high swirl in the combustion chamber 1 in a known way by appropriate shaping or by an appropriate design of the first inlet valve 4 or of its valve seat. The second inlet port 3 is a so-called filling port which opens essentially tangentially into the combustion chamber. Furthermore, two outlet valves 6 and 7 are arranged in the combustion chamber 1. The inlet and outlet valves are actuated, for example, by cams of one or more camshafts (not shown).

The inlet port 2 is preferably designed so as to generate a high swirl with a small valve lift and the inlet port 3 for a high swirl with a large valve lift.

Figure 2:
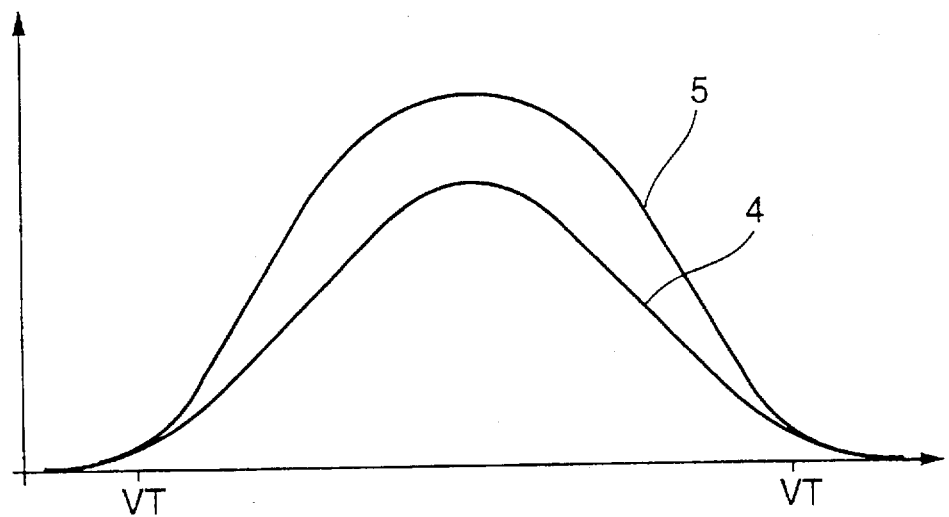
FIG. 2 is a graph of the valve lift curves of the two inlet valves.

As apparent from the graph of FIG. 2, the first inlet valve 4 assigned to the swirl port 2 has a lower lift than the second inlet valve 5 assigned to the filling port 3. The different valve lifts can be achieved, for example, by means of cams having correspondingly different shapes.

Figure 3:
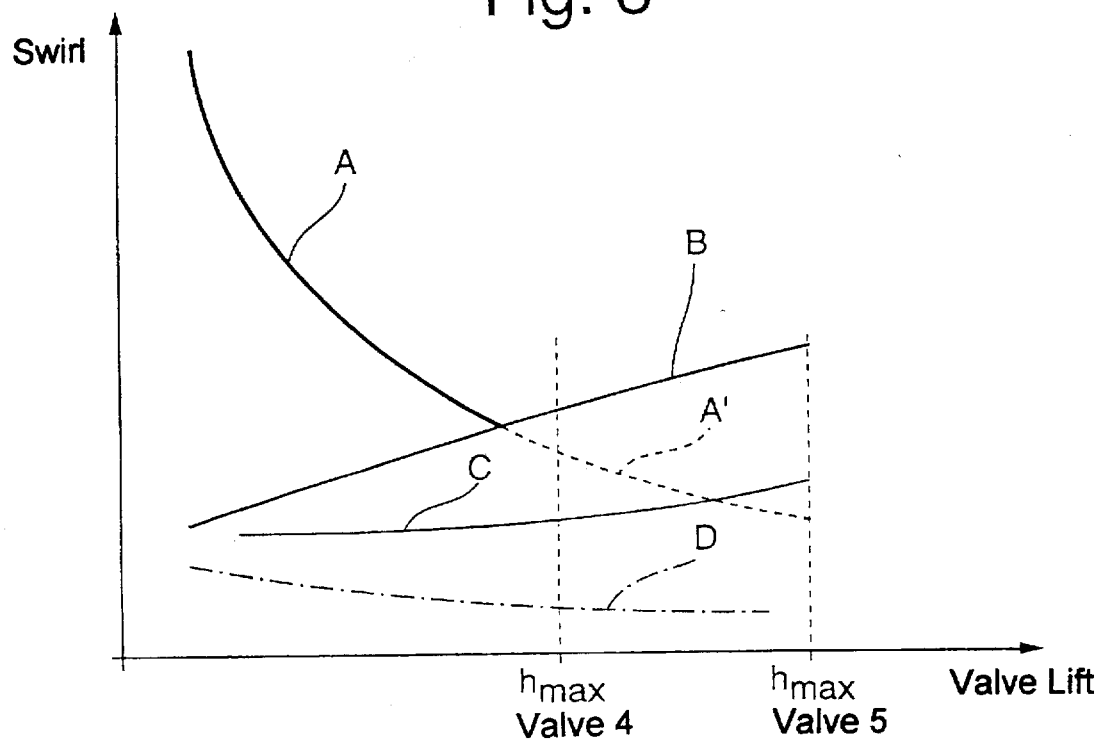
FIG. 3 is a graph representing the swirl as a function of the lift of the two inlet valves.

The graph of FIG. 3 shows the swirl level versus the valve lift. Specifically, curve A shows the level of swirl, generated in the combustion chamber 1 by the swirl port 2, as a function of the lift of the first inlet valve 4, with the second inlet valve 5 closed. Curve B shows the level of the swirl, generated by the filling port 3, as a function of the lift of the second inlet valve 5, with the first inlet valve 4 closed. As is evident with a small lift of the first inlet valve 4, a swirl reduction which occurs with a larger valve lift can be avoided. The area of relatively low swirl of the first inlet valve is represented by the broken curve A'. During operation, when both inlet valves 4 and 5 are opened to different degrees, a swirl level which is represented by the curve C is established in the combustion chamber 1. This curve is well above the curve D which represents the swirl level obtained with two inlet valves which have the same lift. This ensures that a relatively high and virtually uniform swirl is present in the combustion chamber 1 over the entire air intake procedure which provides for a good air-fuel mixture.

Although the arrangement according to the invention is particularly suitable for use with diesel engines, it is of course also suitable for use with gasoline engines, especially for gasoline engines with fuel injection directly into the cylinders of the engine.

What is claimed is:

1. A cylinder head of an internal-combustion engine, especially of a diesel engine, with at least first and second inlet ports per cylinder which have different valve lift dependent swirl levels and which are controlled by first and second inlet valves, respectively, said first inlet valve being assigned to said first inlet port which provides for a high swirl level with a small valve lift having a smaller valve lift than said second inlet valve assigned to said second inlet port which provides for a high swirl level with a large valve lift.

2. A Cylinder head according to claim 1, wherein said second inlet valve assigned to the inlet port providing for the higher swirl level with high valve lift can be changed over to an extremely small valve lift that is to a valve lift whereby the resective inlet port is almost closed but provides for some flow for cooling the valve.

* * * * *